US007328363B2

(12) United States Patent
Mukherjee

(10) Patent No.: US 7,328,363 B2

(45) **Date of Patent: *Feb. 5, 2008**

(54) DYNAMICALLY CONFIGURABLE FAULT TOLERANCE IN AUTONOMIC COMPUTING WITH MULTIPLE SERVICE POINTS

(75) Inventor: Maharaj Mukherjee, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/456,925

(22) Filed: Jul. 12, 2006

(65) Prior Publication Data

US 2006/0248141 A1 Nov. 2, 2006

Related U.S. Application Data

(63) Continuation of application No. 10/604,585, filed on Jul. 31, 2003, now Pat. No. 7,111,188.

(51) Int. Cl.
*G06F 11/00* (2006.01)

(52) U.S. Cl. .......... 714/1

(58) Field of Classification Search .......... 714/1; 370/254–256

See application file for complete search history.

(56) References Cited

U.S. PATENT DOCUMENTS

| | | | | |
|---|---|---|---|---|
| 5,598,532 | A * | 1/1997 | Liron | 703/2 |
| 6,973,473 | B1 * | 12/2005 | Novaes et al. | 709/201 |
| 2003/0235158 | A1 * | 12/2003 | Lee et al. | 370/256 |

* cited by examiner

*Primary Examiner*—Michael C Maskulinski
(74) *Attorney, Agent, or Firm*—Yuansin Cai

(57) ABSTRACT

A method is described for configuring a system having a plurality of processors to provide the system with at least one cluster of processors, where each cluster has one service point. A distance is computed from each processor to other processors in the system. A plurality of total distances is then computed, where each total distance is associated with one processor. A minimum total distance is determined from the plurality of total distances. One processor is assigned to be the service point; this processor is the processor having the minimum total distance associated therewith.

9 Claims, 20 Drawing Sheets

START i,j = 1
301 ith PROCESSOR
302 COMPUTE DISTANCE TO jth PROCESSOR
DONE (j = N) ? — N → j = j + 1
Y
303 COMPUTE TOTAL DISTANCE FOR CLUSTER
DONE (i = N) ? — N → i = i + 1
Y
304 FIND MINIMUM TOTAL DISTANCE
END 577
572
57
571
574

DYNAMICALLY CONFIGURABLE FAULT TOLERANCE IN AUTONOMIC COMPUTING WITH MULTIPLE SERVICE POINTS

CROSS REFERENCE TO RELATED APPLICATIONS

This application is a continuation of U.S. Ser. No. 10/604,585, filed Jul. 31, 2003, now U.S. Pat. No. 7,111,188 the content of which is incorporated by reference in its entirety.

BACKGROUND OF THE INVENTION

This invention relates to autonomic computing, and more particularly to a method for clustering processors and assigning service points in a system for efficient, fault-tolerant, self-configuring and self-healing operation.

Autonomic computing, which generally refers to design of multiprocessor computing systems which are self-monitoring, self-configuring, fault-tolerant and self-healing, is a topic of considerable theoretical and practical interest. One important consideration in building a successful autonomic computing system is to embed the fault tolerance of the system within itself to enhance its self-healing mechanism. The self-healing mechanism would require that in case of a fault the system would immediately detect the nature of the fault and try to correct the fault. In a case where it could not correct for the fault, the system would minimize the ensuing performance degradation by assigning the task of the faulty processor to one or more other processors. In a typical computer architecture, this task of fault detection and management is either done by one of the processors or by a master processor.

The processors comprising an autonomic computing system may be distributed over a geographically large area. Furthermore, the processors may be of many different types, running many different types of operating systems, and connected by a distributed network. The various processors are often geographically arranged in clusters. Such an arrangement does not permit having one master processor managing the fault tolerance of the entire system. It is therefore advantageous to have some of the processors do the fault management. These processors will be referred to herein as service points.

A typical system utilizing a service point is shown in FIG. 1A. The system 1 includes several interconnected processors 2, with one of those processors assigned to be the service point 10. Generally, the service point is chosen to be the processor having the smallest distance to the other processors. The term "distance" is used herein as a measure of the communication time required between processors. The service point has several tasks in addition to its own regular computing load: (1) detecting a faulty processor elsewhere in the system; (2) replacing a faulty processor by reassigning that processor's tasks to other processors; (3) monitoring the tasks being performed by the other processors; and (4) balancing the load on the system to ensure optimum performance. FIG. 1B illustrates a situation where a processor 3 has had a fault detected by the service point 10, and has been removed from the system; the remainder of the system continues to operate.

Though fault tolerance using redundant computation has been used for some time, the self-healing and self-configuring features of current autonomic computation systems raise several new concerns, for example:

(1) The self-configurable and the self-adjustable features of an autonomic system work much better when all of the processors (including those distantly located) are uniform and interchangeable. This means that the service points should not be special processors but rather chosen from the same set of processors working an extra load.

(2) Usually, in parallel and scalable computer architectures the number of service points is fixed and cannot be specified as a fraction of the number of active processors. However, having too few service points causes the self-healing mechanism to be too slow; having too many service points degrades the overall performance of the system.

(3) Since the autonomic computing system works in a dynamic environment, it is important to dynamically optimize clustering and service point assignment to optimize system performance. It should be noted that in an on-demand computing environment, the total number of processors (and thus the composition of clusters and assignment of service points) is constantly changing in response to the computing load.

In the self-configuring environment of an autonomic computing system, it generally is not possible to preassign the service points. Therefore, depending on the requirements of the situation any current processor can be dynamically assigned to be a service point. On the other hand, creating too many service points leads to a large computational load on the system. It is desirable, therefore, to keep the number of service points limited to a certain fraction of the working processors.

The current problem is, therefore: given a set of processors in a distributed and dynamic environment, and a number representing the fractional value of the ratio of the maximum number of service points to the total number of working processors, to determine the service points and the processors each service point would service.

The idea of clustering has been successfully applied to many other fields. However, in all the above-noted applications areas the number of clusters cannot be specified a priori. It is necessary to put an upper bound to the number of clusters so that the overhead for extra service points is always bounded. The problem of clustering with a fixed limit is generally known as intractable-that is, an efficient optimal solution does not exist. There is still a need, however, for a solution that is efficient though suboptimal. More particularly, there is a need for an efficient procedure for dynamically assigning the various processors in a system to clusters, and for assigning service points within each cluster, to ensure optimum performance (including self-configuring and self-healing) of the system.

SUMMARY OF THE INVENTION

The present invention addresses the above-described need by providing a method is described for configuring a system having a plurality of processors to provide the system with at least one cluster of processors, where each cluster has one service point. According to the present invention, this is done by computing a distance from each processor to other processors in the system. A plurality of total distances is then computed, where each total distance is associated with one processor. A minimum total distance is determined from the plurality of total distances. One processor is assigned to be the service point; this processor is the processor having the minimum total distance associated therewith.

According to another embodiment of the invention, the method further includes partitioning the system into a plurality of clusters. This partitioning process may include sorting the processors in accordance with the total distance associated with each processor; assigning each processor to one of two clusters; determining a minimum total distance for the processors in each cluster in accordance with the plurality of total distances associated with the processors in that cluster; and assigning as the service point for each cluster the processor having the minimum total distance associated therewith in said cluster.

According to a further embodiment of the invention, one of two clusters is subdivided into two clusters, thereby partitioning the system into three clusters. A minimum total distance is determined for the processors in each of those three clusters in accordance with the plurality of total distances associated with the processors in the three clusters. The processors are assigned to the three clusters in accordance with the minimum total distance; the processor having the minimum total distance associated therewith in each cluster is assigned as the service point for that cluster.

According to an additional embodiment of the invention, the processors may be of different types, and the processors are assigned to clusters in accordance therewith.

The system may be configured dynamically when a processor is added to or removed from the system. Furthermore the partitioning of the system may be dynamically changed when a processor is removed from the system.

In each cluster, another processor may be assigned as a backup service point, to assume the functions of the service point if the service point is removed from the system.

In accordance with another embodiment of the invention, a computer-readable storage medium is provided, having stored therein instructions for performing a method for configuring a system having a plurality of processors to provide the system with at least one cluster of processors, each cluster having one service point, This method comprises the steps of computing a distance from each processor to other processors in the system; computing a plurality of total distances, where each total distance is associated with one processor; determining a minimum total distance from the plurality of total distances; and assigning as the service point the processor having the minimum total distance associated therewith.

BRIEF DESCRIPTION OF THE DRAWINGS

FIG. 3F-2 schematically illustrates an alternative subdivision of clusters in a system.

DETAILED DESCRIPTION OF PREFERRED EMBODIMENTS OF THE INVENTION

Figure 1A:
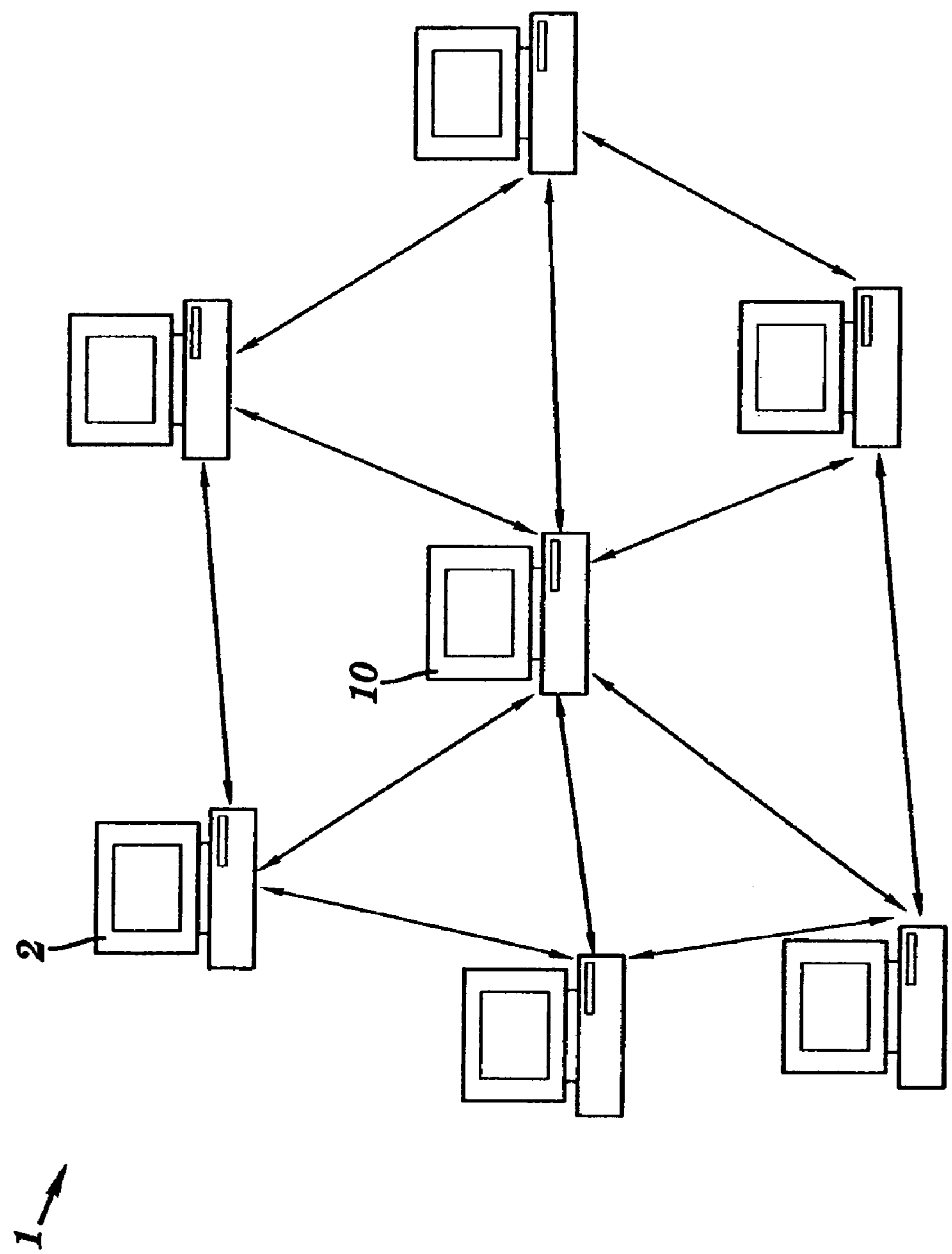
FIG. 1A illustrates a typical arrangement of processors in a system having a service point.
Figure 1B:
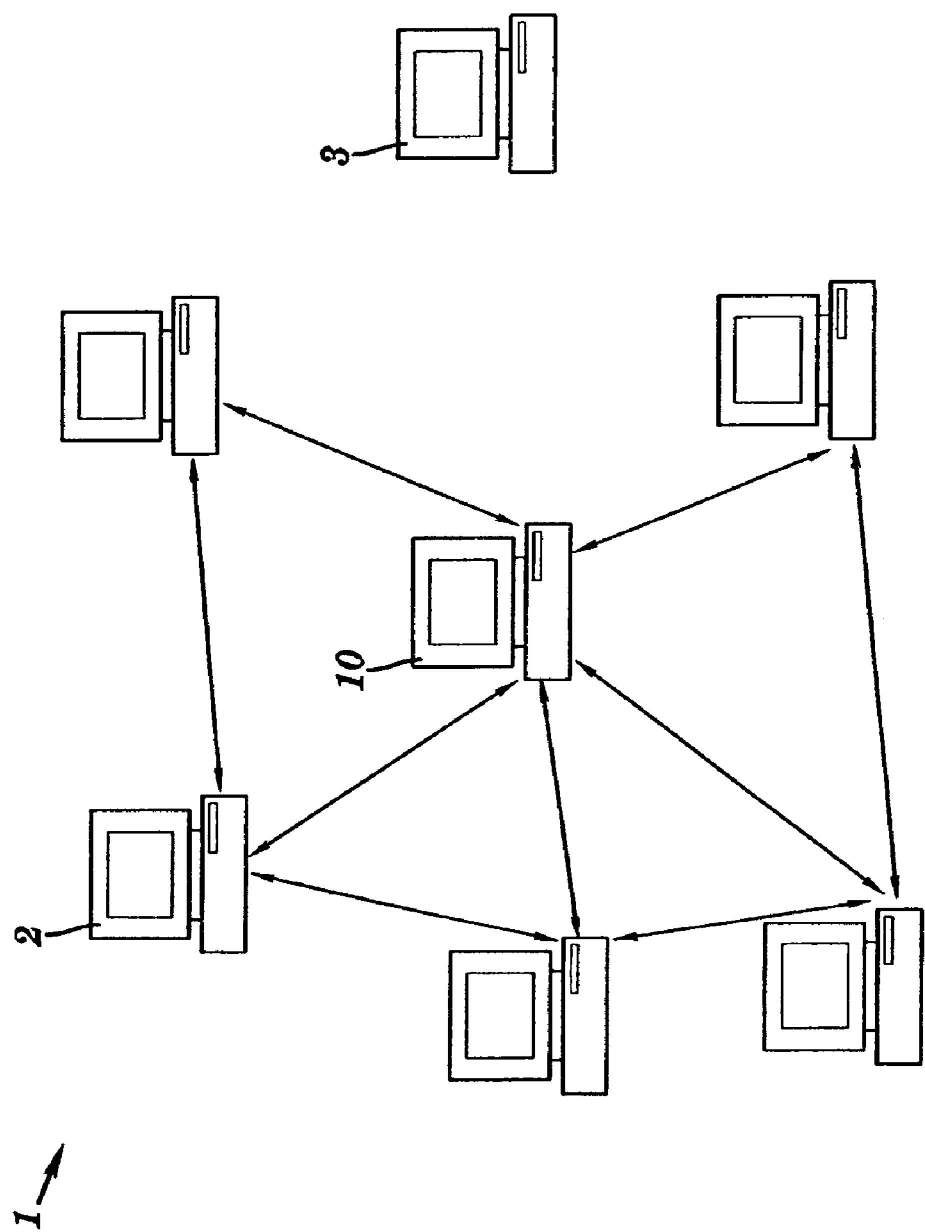
FIG. 1B illustrates the system of FIG. 1A after a faulty processor is removed from the system.
Figure 2:
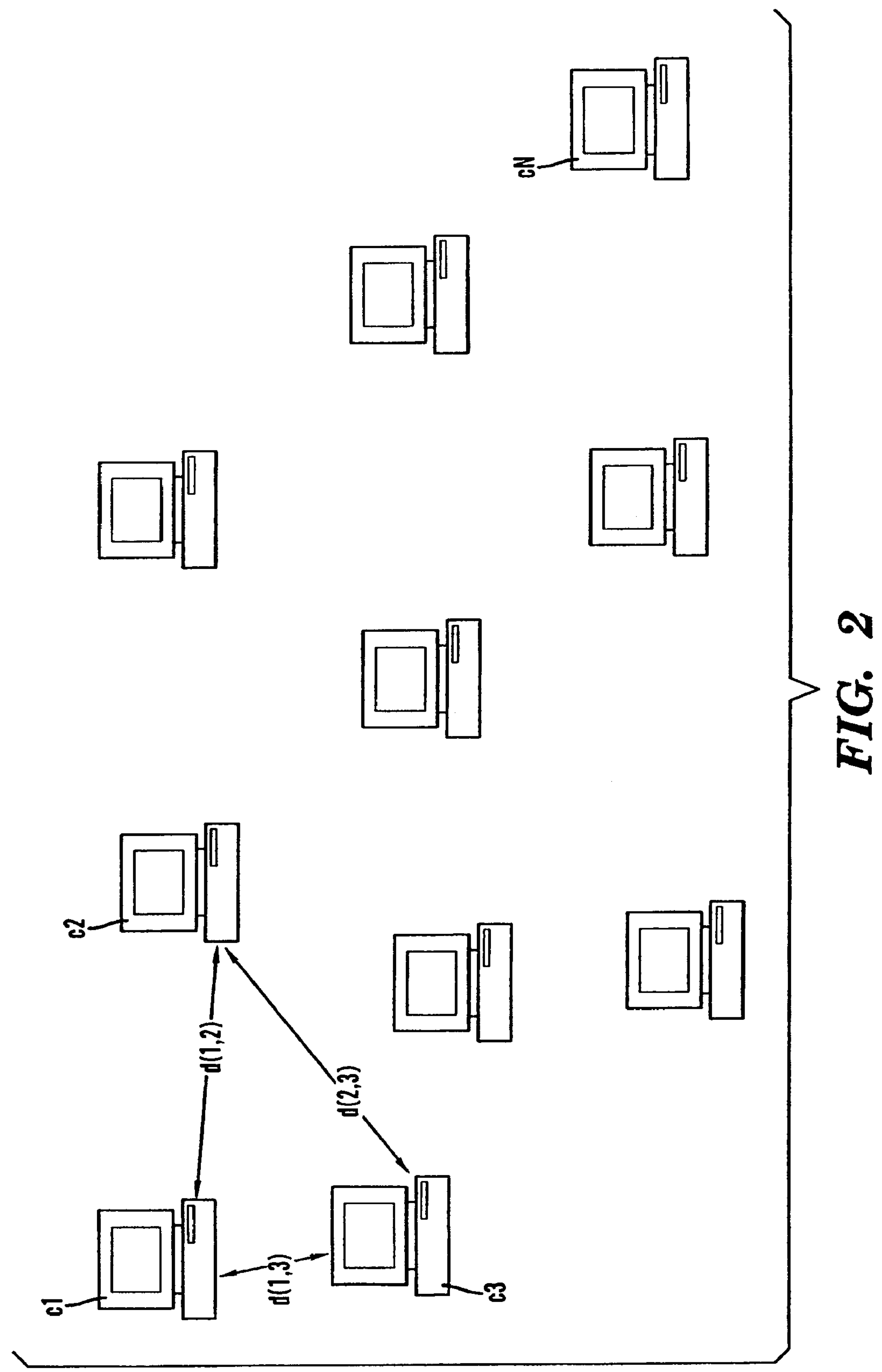
FIG. 2 illustrates a system having multiple processors, with distances between the processors determined in accordance with the present invention.

In the following description it will be assumed that the system has a set of N processors c1, c2, . . . , cN (see FIG. 2). A distance function d(i,j) is defined between processors ci and cj, so that d(i,i)=0 and d(i,j) satisfies the triangular inequality: d(i,j)+d(j,k) is greater than or equal to d(i,k). In terms of communication between processors, this means that communication through the j-th processor must be slower than direct communication between the i-th and k-th processors. The distance d(i,j) is a function of the speed of the communication network, the rate of data exchange and data volume, and the geographic location of the processors.

A fractional value f is defined as the maximum fraction of the N processors that can take the extra load of acting as service points. A number p=N*f then represents the maximum number of processors acting as service points. Accordingly, the system may have a maximum of p clusters.

According to the invention, a method is provided for assigning clusters and service points in a system of N processors having p clusters, in several cases of increasing complexity, as follows:

Case 1: Static System of Uniform Processors.

The system of processors c1, c2, . . . , cN is to be divided into p different clusters, where each cluster is identified with a service point so that the sum of the maximum distance of all the processor belonging to a cluster to the corresponding service points of the cluster is minimized.

Figure 3A:
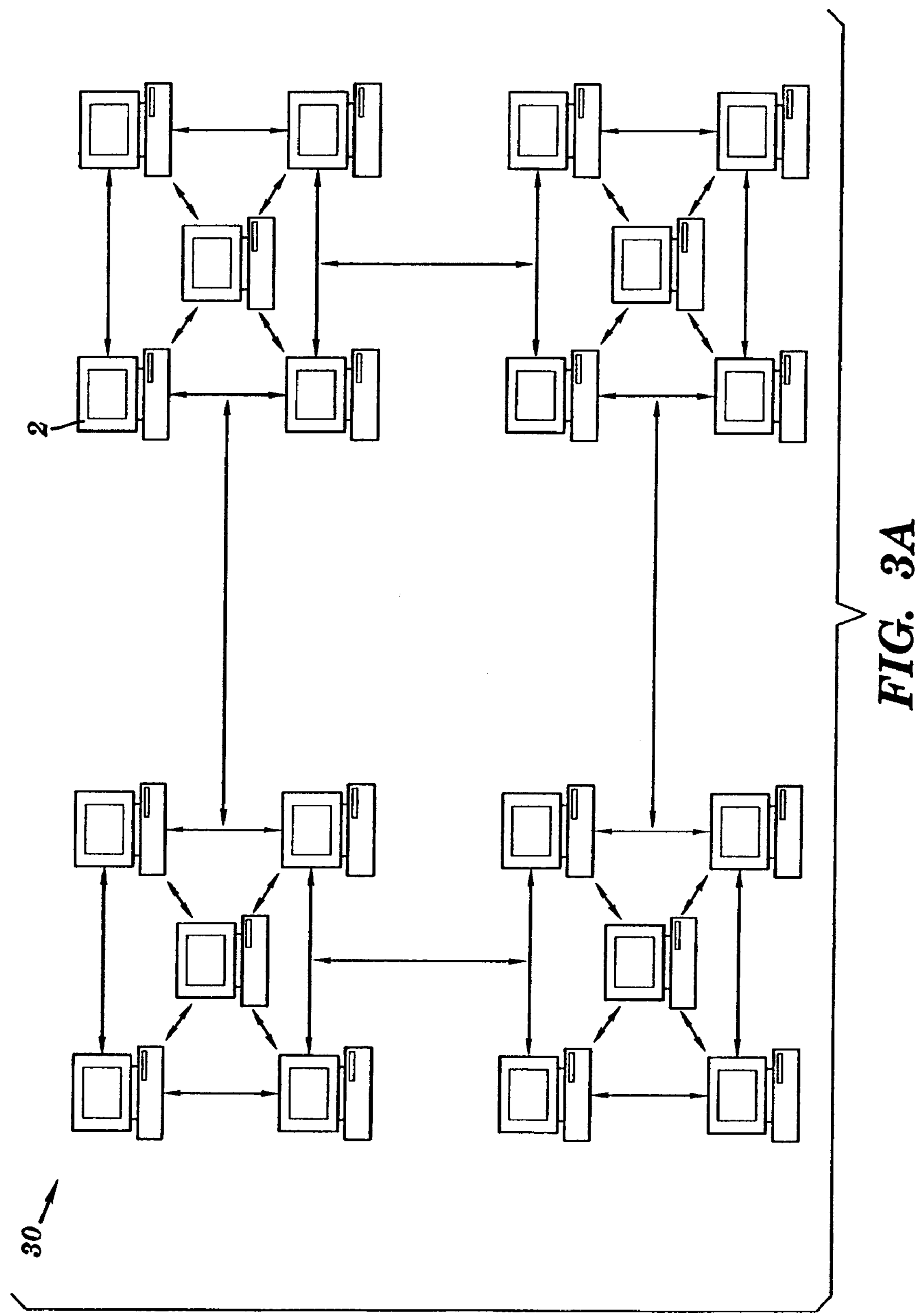
FIG. 3A illustrates a system having multiple processors which is to be configured into clusters with service points, in accordance with an embodiment of the invention.

For example, FIG. 3A illustrates a system 30 having N=20 processors which is to be divided into p=4 clusters. In this example the fraction f is thus 1/5; in practice f is much smaller, generally in the range 1/50 to 1/100.

The method will first be described for simple cases when p=1 and p=2, that is, for 1 and 2 clusters. These two cases form the basis of the nontrivial case.

For p=1, that is, for a single cluster, the following algorithm is used.

Algorithm(N,1):

For i=1 to i=N do:

set d_i=SUM {d(i,j)} for j=1 to N and j not equal to i;

Output i so that d_i is smallest for i=1 to N.

Figure 3B:
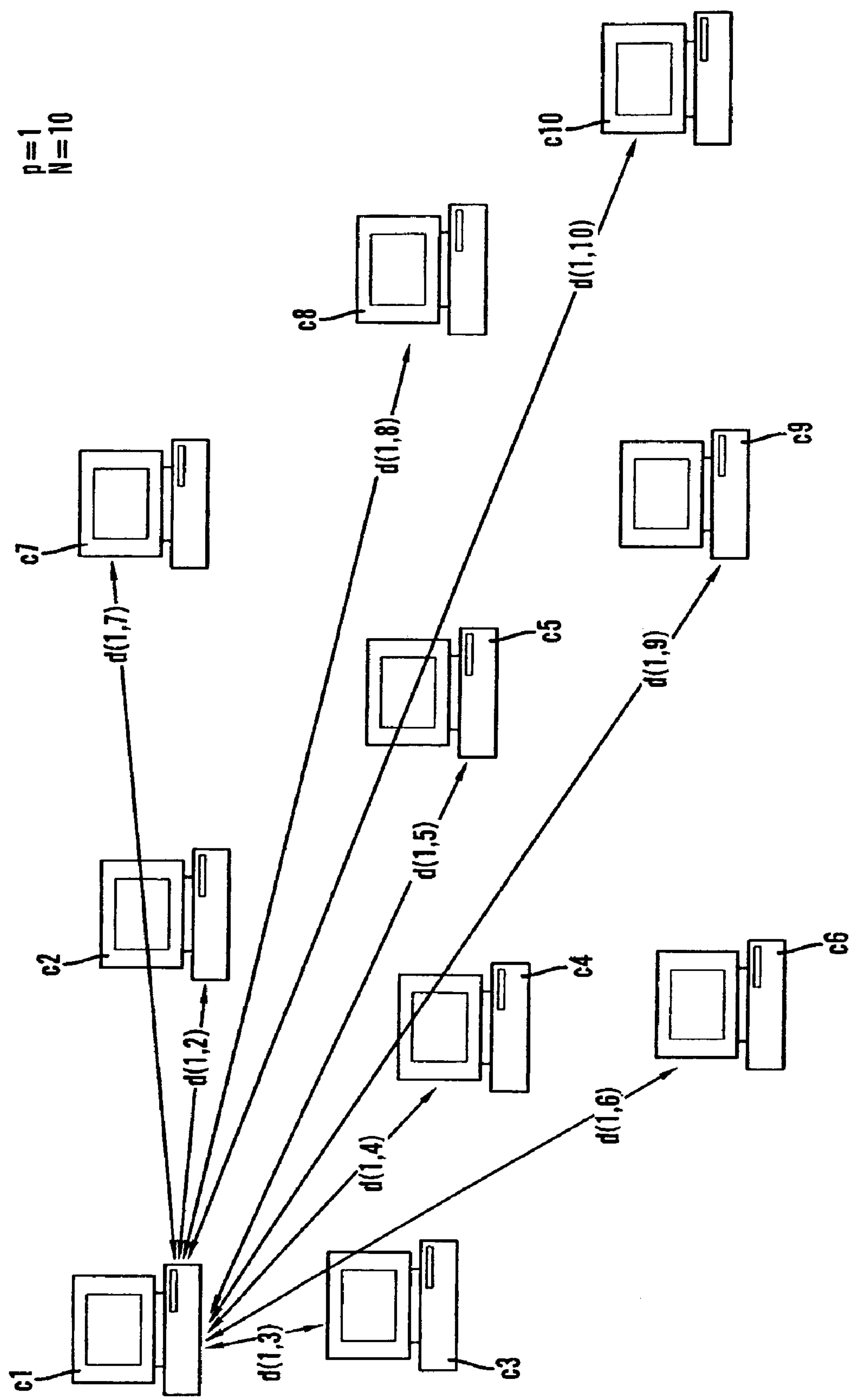
FIG. 3B schematically illustrates the procedure for computing the total distance from one processor to other processors in a system, in accordance with the invention.

FIG. 3B illustrates a system having N=10 processors where the distance d(1,j) is computed for processor c1. The sum of the distances d(1,2), d(1,3), . . . , d(1,10) is the total distance for processor c1.

Figure 3C:
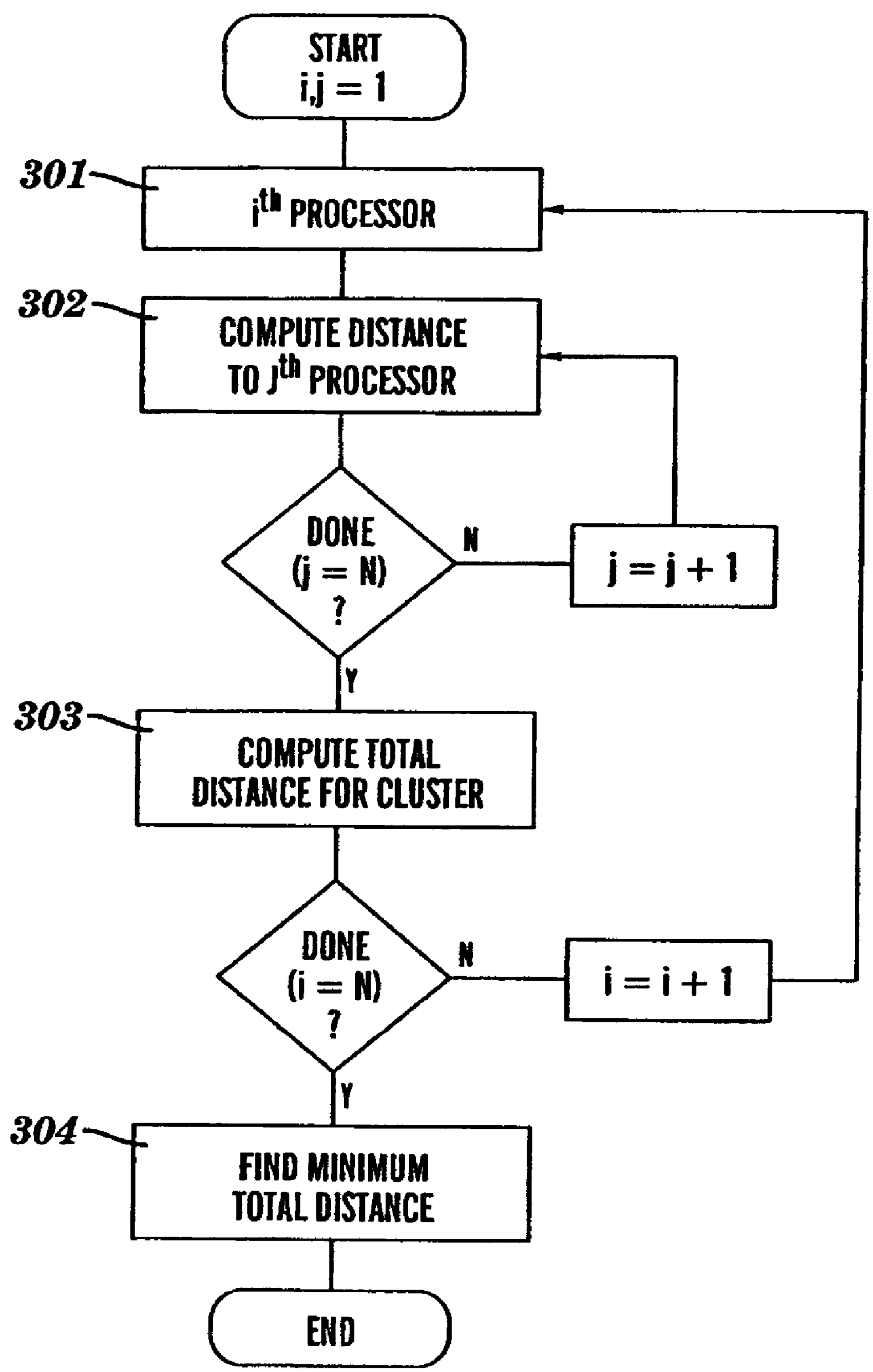
FIG. 3C is a flowchart detailing steps in algorithm(N,1) in accordance with an embodiment of the invention.

FIG. 3C is a flowchart illustrating algorithm (N,1). Beginning with the first processor (i=1 in step 301), the distance is computed between that processor and each of the other processors (step 302). The sum of these distances is the total distance for the i-th processor in the cluster (step 303). The processor whose total distance is the minimum (step 304) would then be the service point for the cluster.

For p=2, that is, for two clusters, the following algorithm is used, in which the method of algorithm(N,1) is used iteratively. As an initial step, the entire set of N processors is treated as a single cluster, and the foregoing algorithm (N,1) is used to compute a total distance for each processor; that is, each of the N processors has a total distance representing the sum of distances from that processor to the other processors. This distance for the i-th processor is denoted as d(i,1). The N processors may then be sorted according to this distance.

Algorithm(N,2):

1. Sort the processors by distance d(i,1).
2. Intitialize two clusters L1 and L2, where L1 contains all N processors and L2 contains 0 processors.

2.i Compute the point of service for L1 and its smallest distance using algorithm(N,1);

2.ii Initialize d_0 to that distance.

3. Scan the processors c1, c2, . . . , cN in their sorted order:

3.i: For each processor c_i, remove it from L1 and put it in L2.

3.ii. Compute the point of service for both L1 and L2 and the smallest sum of distances d$_{—1i\ and\ d—2i}$ 3.iii. Set the sum of distances d_i=d_1i+d$_{—2i}$ 4. Choose the distance di for i=1 to N so that d_i is minimum and output the clusters L1 and L2 for that distance.

Figure 3D:
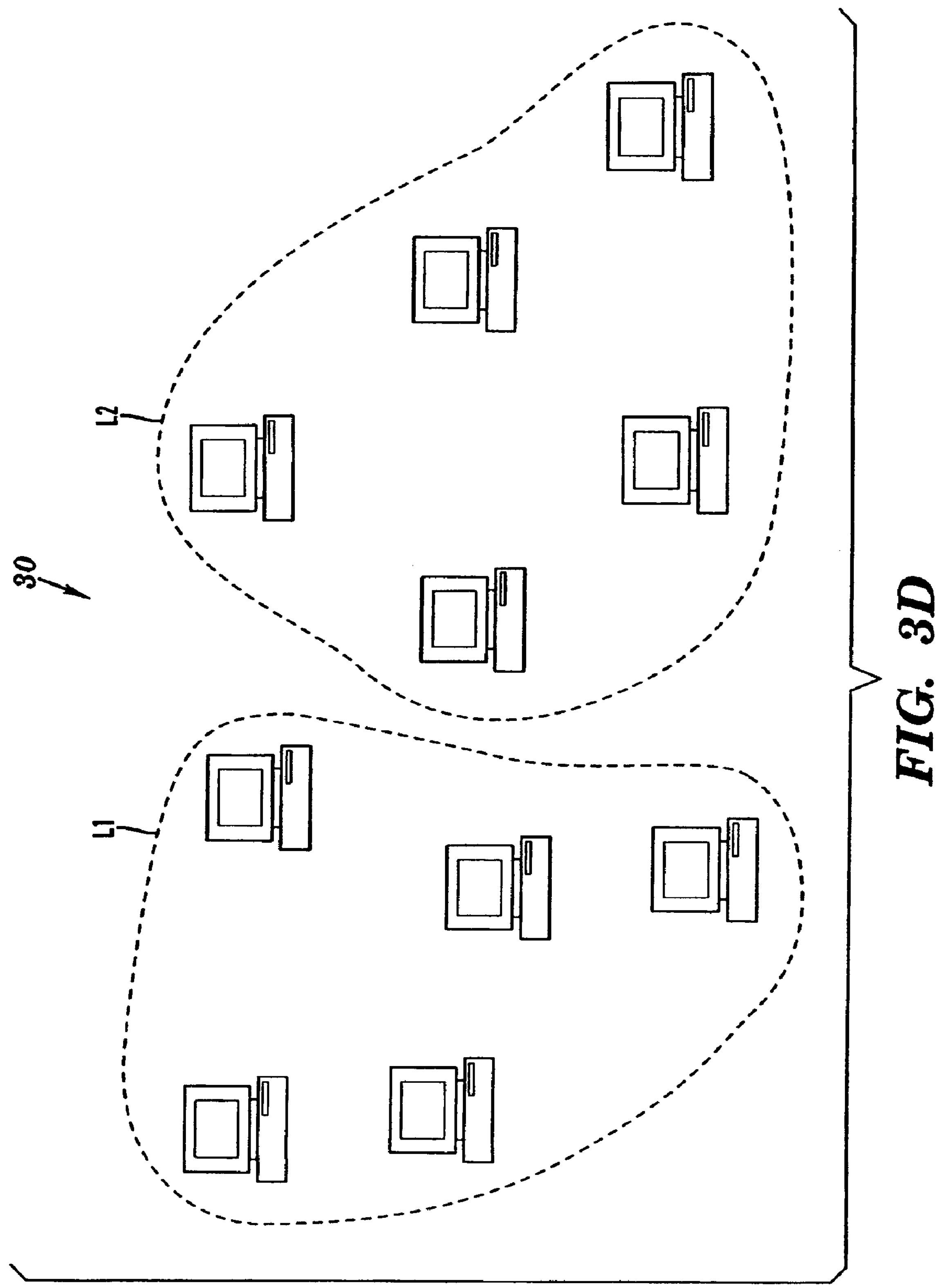
FIG. 3D schematically illustrates a system divided into two clusters.
Figure 3E:
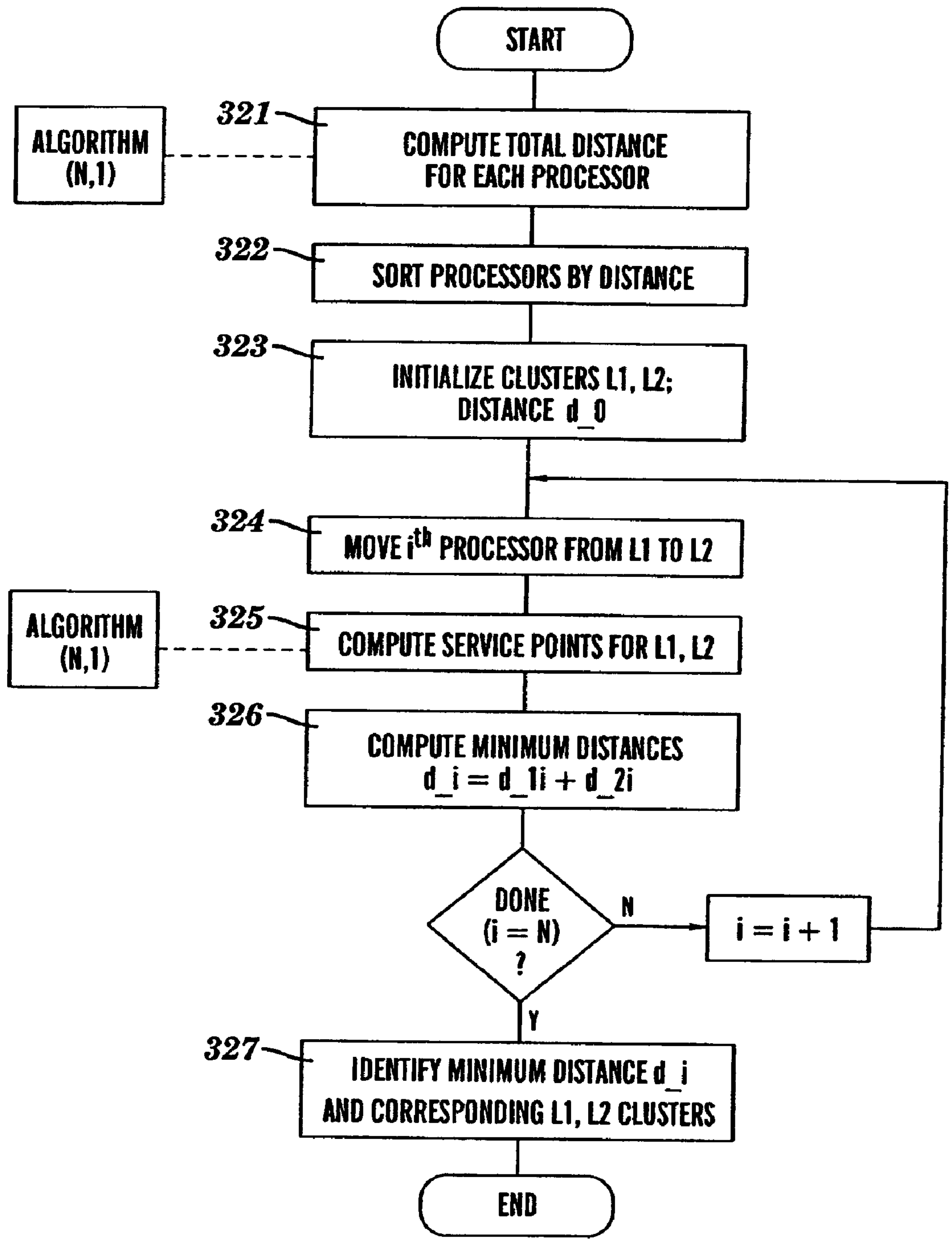
FIG. 3E is a flowchart detailing steps in algorithm(N,2) in accordance with an embodiment of the invention.

FIG. 3D is a schematic illustration of the system 30, with N=10 processors, divided into two clusters L1 and L2. FIG. 3E shows a flowchart illustrating algorithm(N,2). As noted above, the total distance for each processor in the system is first computed using algorithm(N,1) (step 321), and the processors are then sorted according to this distance (step 322). In the initial assignment of clusters, all 10 processors are in cluster L1, and no clusters are in cluster L2. The initial minimum total distance d_0 is thus the same as that previously computed using algorithm (N,1) (step 323). Each processor (proceeding in the sorted order by distance, as computed using algorithm(N,1), beginning with the smallest distance) is successively moved from cluster L1 to cluster L2 (step 324), and the minimum total distance for each cluster is computed using algorithm(N,1) for each iteration (step 325). In the i-th iteration, the minimum distance is denoted d_1*i* for cluster L1 and d_2*i* for cluster L2. A combined minimum distance d_i=d_1*i*+d_2*i* is then computed (step 326). In one of the N iterations, the value of d_i will be a minimum; this value is chosen as the total distance for the system, with the corresponding cluster assignments (step 327).

For the non-trivial case of p clusters the above algorithm (N,2) is used iteratively. At each stage, each of the created clusters is divided into two parts using algorithm(N,2); the cluster assignments that minimize the total distance function are then identified.

Figures 1, 3F:
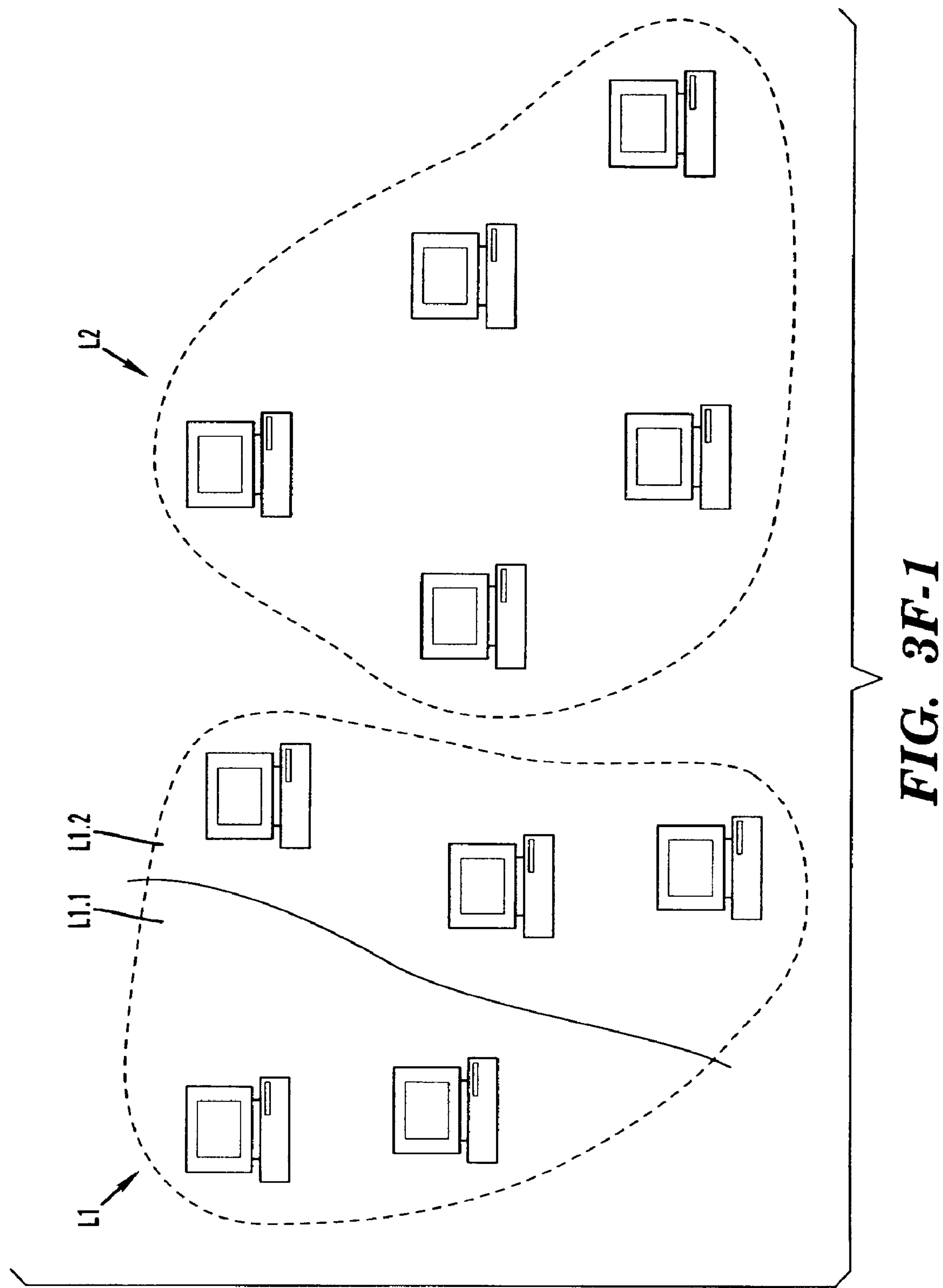
FIG. 3F-1 schematically illustrates a system wherein a cluster is subdivided, in accordance with an embodiment of the invention.
Figures 2, 3F:
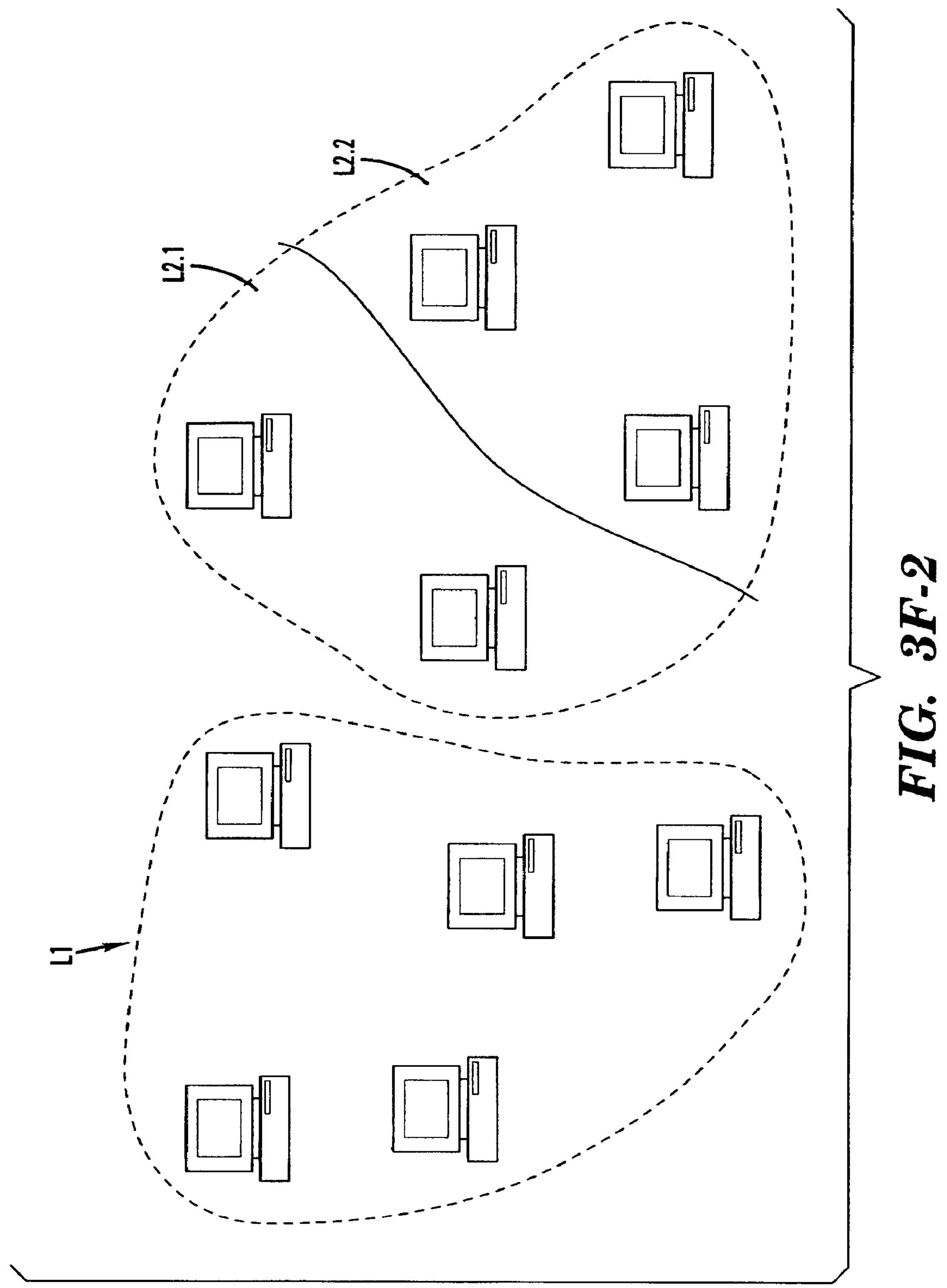

For example, the system of N=10 processors shown in FIG. 3D is divided into two clusters L1 and L2, as the algorithm(N,2) is performed. Then in the next stage, cluster L1 is divided into two clusters L1.1 and L1.2, while L2 is left intact (FIG. 3F-1). The total distance (denoted d2.1) is then computed, as the sum of the cluster distances of L1.1, L2.1 and L2. Then cluster L2 is divided into two clusters L2.1 and L2.2, with L1 left intact (FIG. 3F-2). The total distance (now given as d2.2) is again computed, as the sum of the cluster distances of L1, L2.1 and L2.2. The smaller of d2.1 and d2.2 is chosen, along with the cluster configuration corresponding thereto. Thus if d2.1<d2.2, then the clusters L1.1, L1.2 and L2 are chosen. The subdivisions L1.1 and L1.2 are renamed L1 and L3 respectively, and the total distance for this set of clusters d3 is set equal to d2.1.

In the same manner, at any iterative stage q+1, where q=2, . . ., N−1, there are existing clusters L1, . . . , L_q. Then q sets of q+1 clusters are created by dividing each of the clusters L1, . . . , L_q one at a time into two parts L_{j.1} and L_{j.2} for j=1, . . . , q while keeping all other clusters intact. The distance d_{q.1}, . . . , {d_{q.q}} is then computed for each of these clusters. The smallest distance among these distances is chosen, along with the corresponding cluster configuration. Suppose that d_{m,j}=min {d_{q.1}, . . . , {d_{q.q}} }. Then the corresponding cluster {L1, L2, . . . Lm.1, Lm.2, . . . , Lq} is chosen. Then the distance d_{q+1} is set equal to d_{m,j}, Lm=Lm.1 and L_{q+1}=Lm.2. This process yields a set of q+1 clusters, each with its own service point.

Figure 3G:
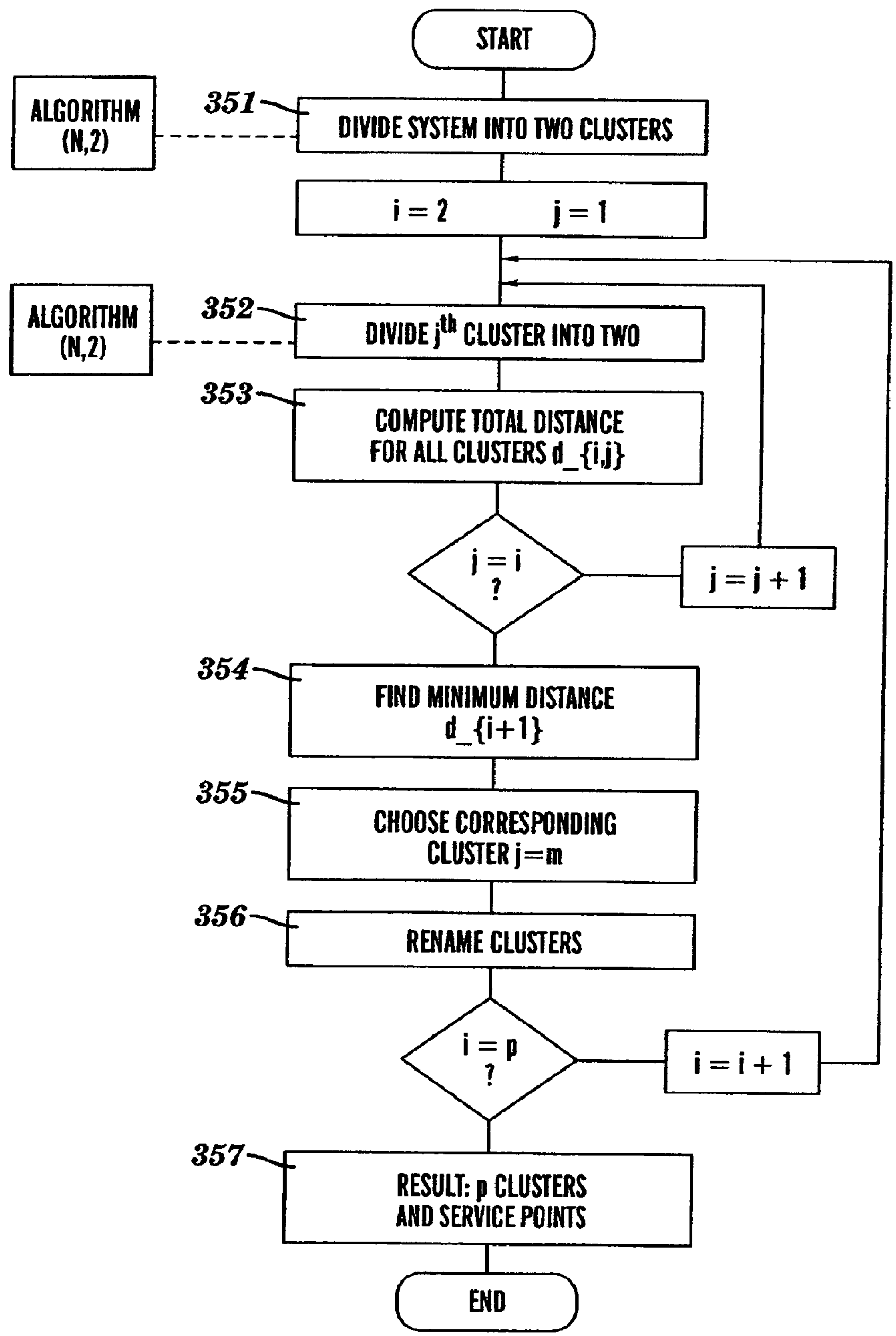
FIG. 3G is a flowchart detailing steps in algorithm(N,p) in accordance with an embodiment of the invention.
Figure 3H:
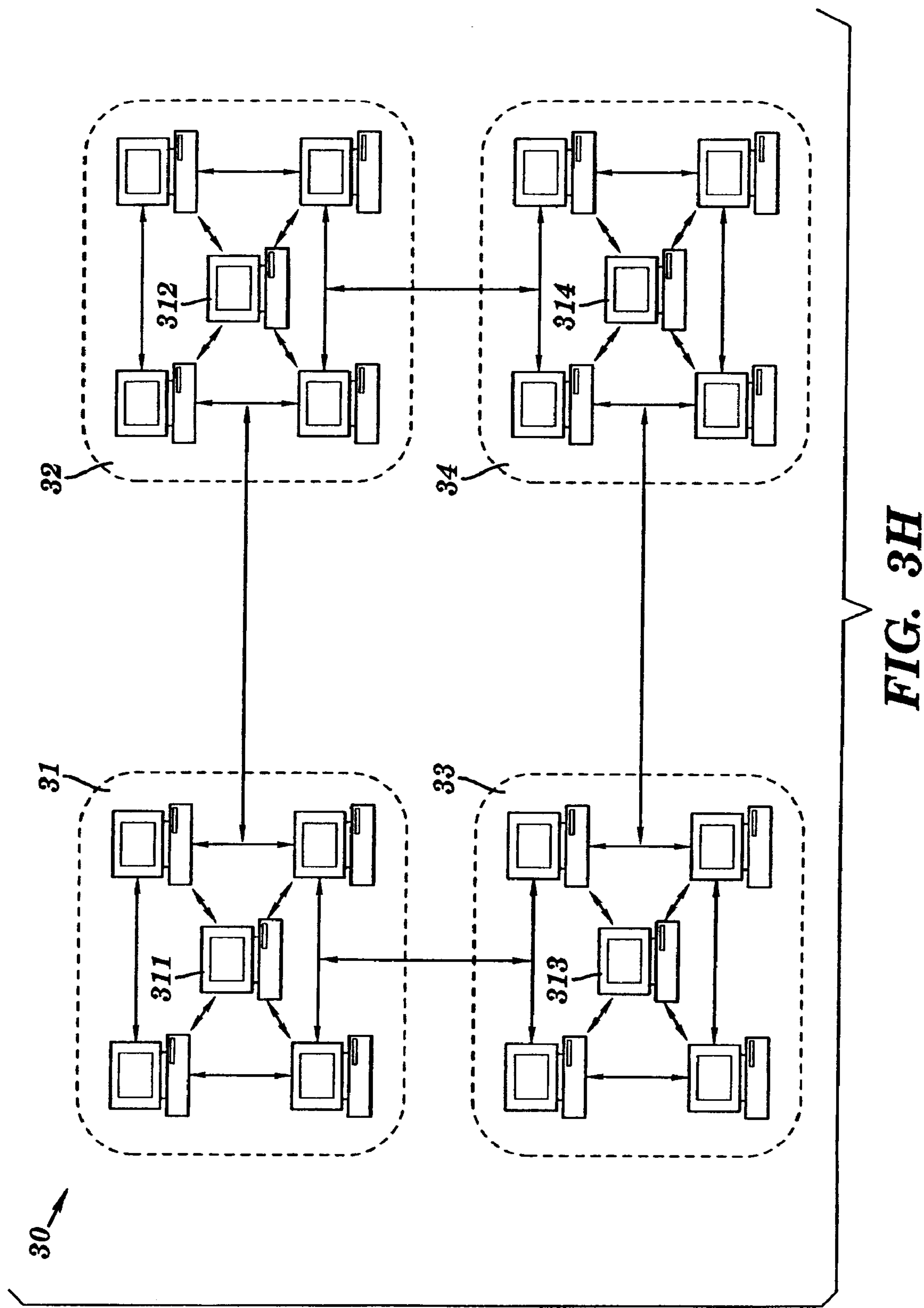
FIG. 3H shows the result of a process for configuring clusters and assigning service points in the system of FIG. 3A.

The algorithm for p clusters is as follows:

Algorithm (N,p):

0. Divide the set of processors into two clusters by using algorithm(N,2).
1. for i=2 to p do:
   1.1. for j=1 to i do
      1.1.1 Divide Lj to Lj.1 and Lj.2 using algorithm(N,2).
      1.1.2 Sum the total distance of the clusters and call it d_{i.j}
   1.2 Set d_{i+1}=min {d_{i.j}| for j=1 to i}.
   Let the value of j for which the minimum occurs be j=m,
   1.3 Set Lm=Lm.1
   1.4 Set L_{i+1}=Lm.2
2. Return the results L1, . . . Lp FIG. 3G shows a flowchart for the foregoing algorithm (N,p). The system is first divided into two clusters using the algorithm(N,2) (step 351). An iteration is then performed where the j-th cluster is divided into two using algorithm (N,2) (step 352), and the total distance for all of the clusters (including the two subdivided clusters) is computed (step 353). The minimum of these total distances is found (step 354), and the cluster configuration corresponding thereto is chosen (step 355). The clusters are then renamed as described above with reference to FIGS. 3F-1 and 3F-2 (step 356). The clusters are redivided until a set of p clusters is found (step 357). The system then has a set of p clusters, each with one service point. A result of this process is shown schematically in FIG. 3H (compare FIG. 3A), for N=20 processors and p=4 clusters. The system 30 is divided into four clusters 31, 32, 33, 34 with respective service points 311, 312, 313, 314.

Case 2: Static system of Non-Uniform Processors.

Figure 4A:
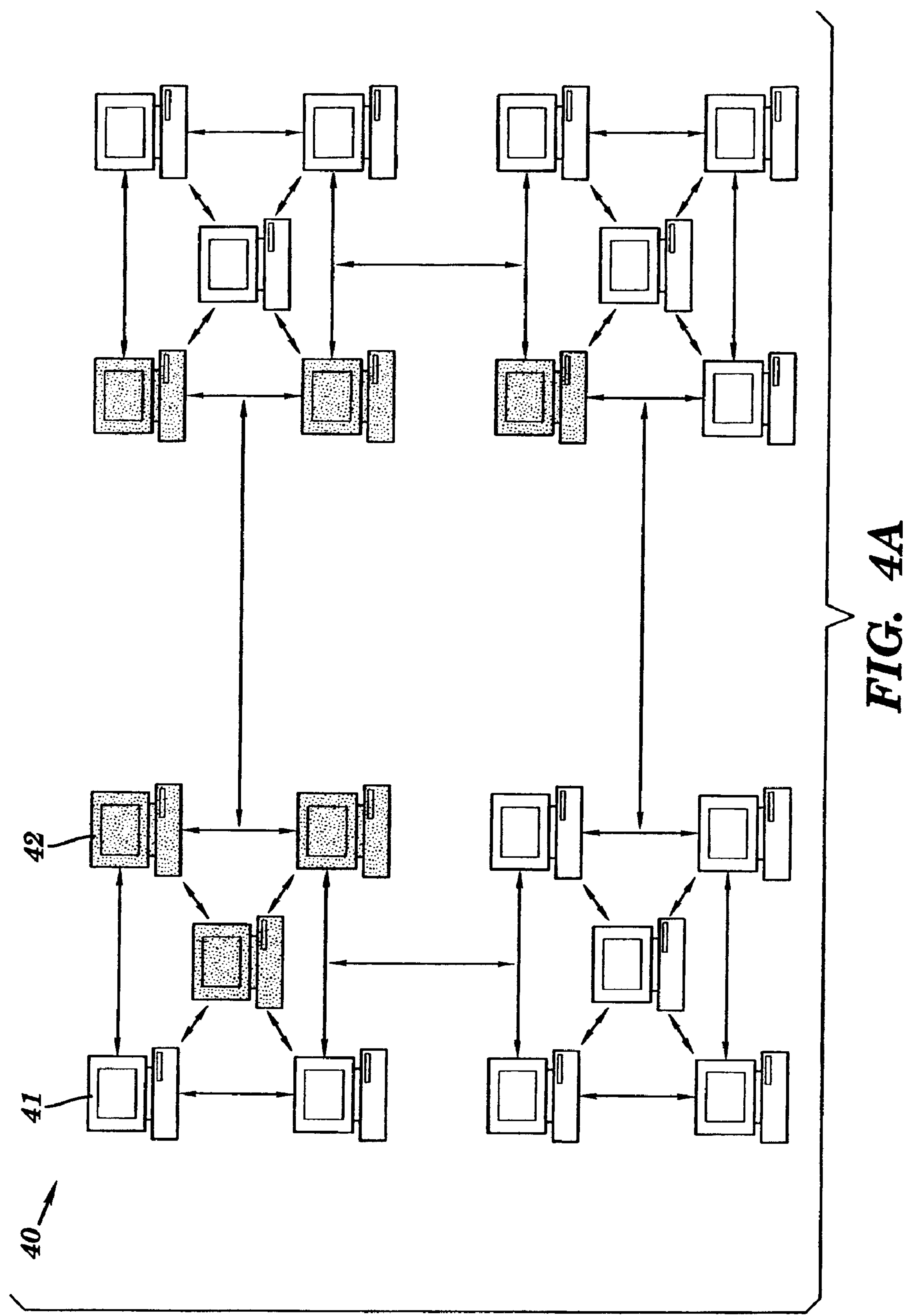
FIG. 4A illustrates a system having multiple processors of different types which is to be configured into clusters with service points, in accordance with a further embodiment of the invention.

FIG. 4A is a schematic illustration of a system 40 where the processors are not all uniform, but are pregrouped according to their operating systems and/or technology and the service point for a type of processor must be of the same type. In system 40, the processors are of two types 41 and 42. It will be appreciated that the different types of processors may communicate with each other over a network running a processor-independent protocol such as TCP/IP. For example, an autonomic computing environment may be set up using a set of Windows-based processors running on Intel chips and a set of servers running AIX. The service point for the Intel systems must be an Intel system and the service point for the AIX system must be an AIX based system. The system 40 thus must be divided into clusters so that all processors in a cluster are of the same type.

Figure 4B:
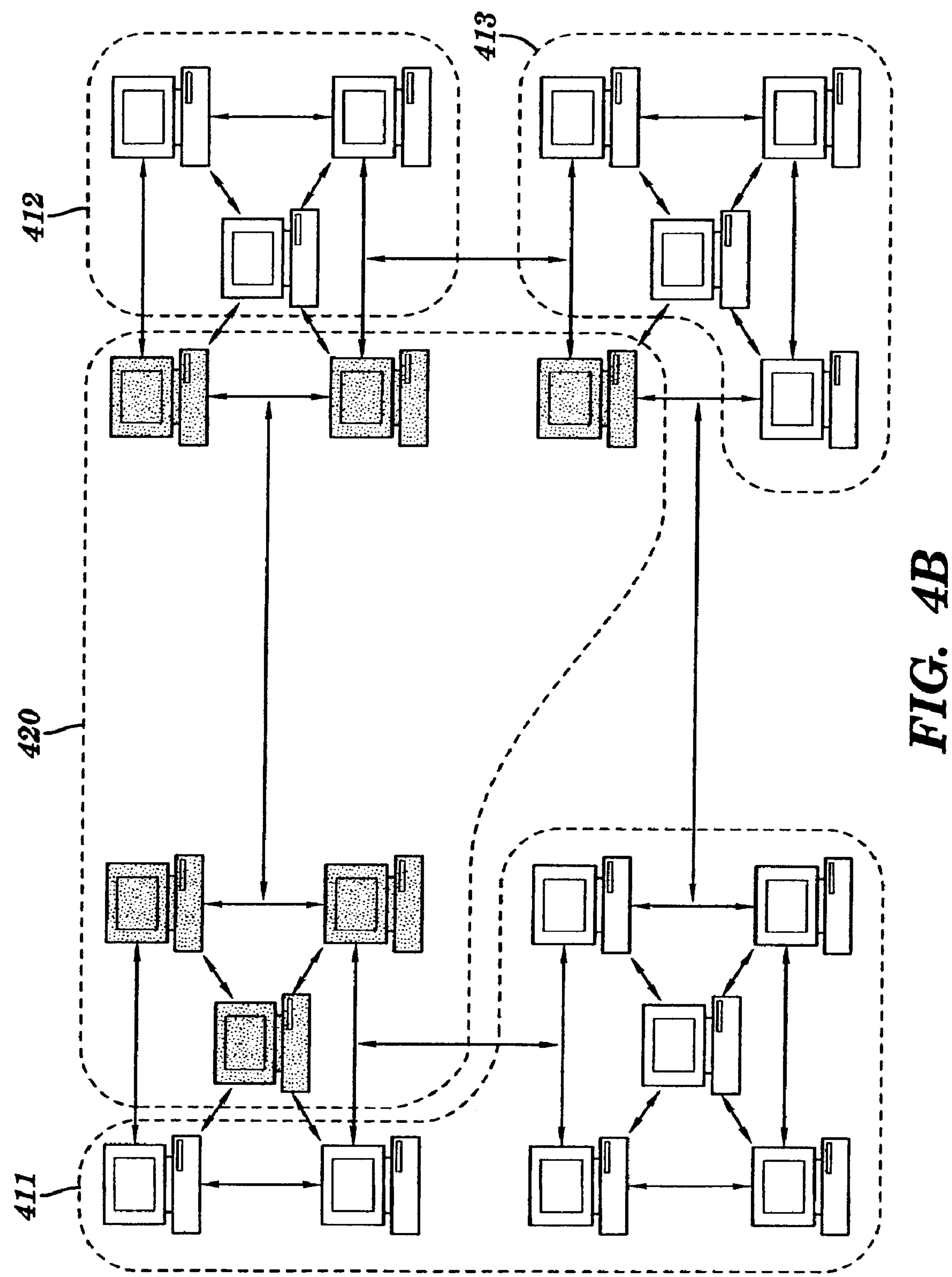
FIG. 4B shows the result of a process for configuring clusters and assigning service points in the system of FIG. 4A.

The solution for this case can be obtained from that of Case 1 discussed above. Suppose there are m different types of processors and the service point for each of these different types can be only from its own kind. In this case we first check if $m<p$, where p is the maximum number of clusters. If $m>=p$ (which is very unlikely in a practical system), then the clusters are simply grouped according to the type of processors. For $m<p$, the clusters are initialized by grouping the processors into m clusters L1, . . . , Lm each containing only the same type of clusters. Then the algorithm(N,p) is applied to these m clusters. A result of this process is shown schematically in FIG. 4B, with N=20, m=2 and p=4. Processors 41 are grouped into clusters 411, 412, 413, while processors 42 are grouped into cluster 420.

Case 3. Dynamic System Processors Entering and Leaving System.

Figure 5A:
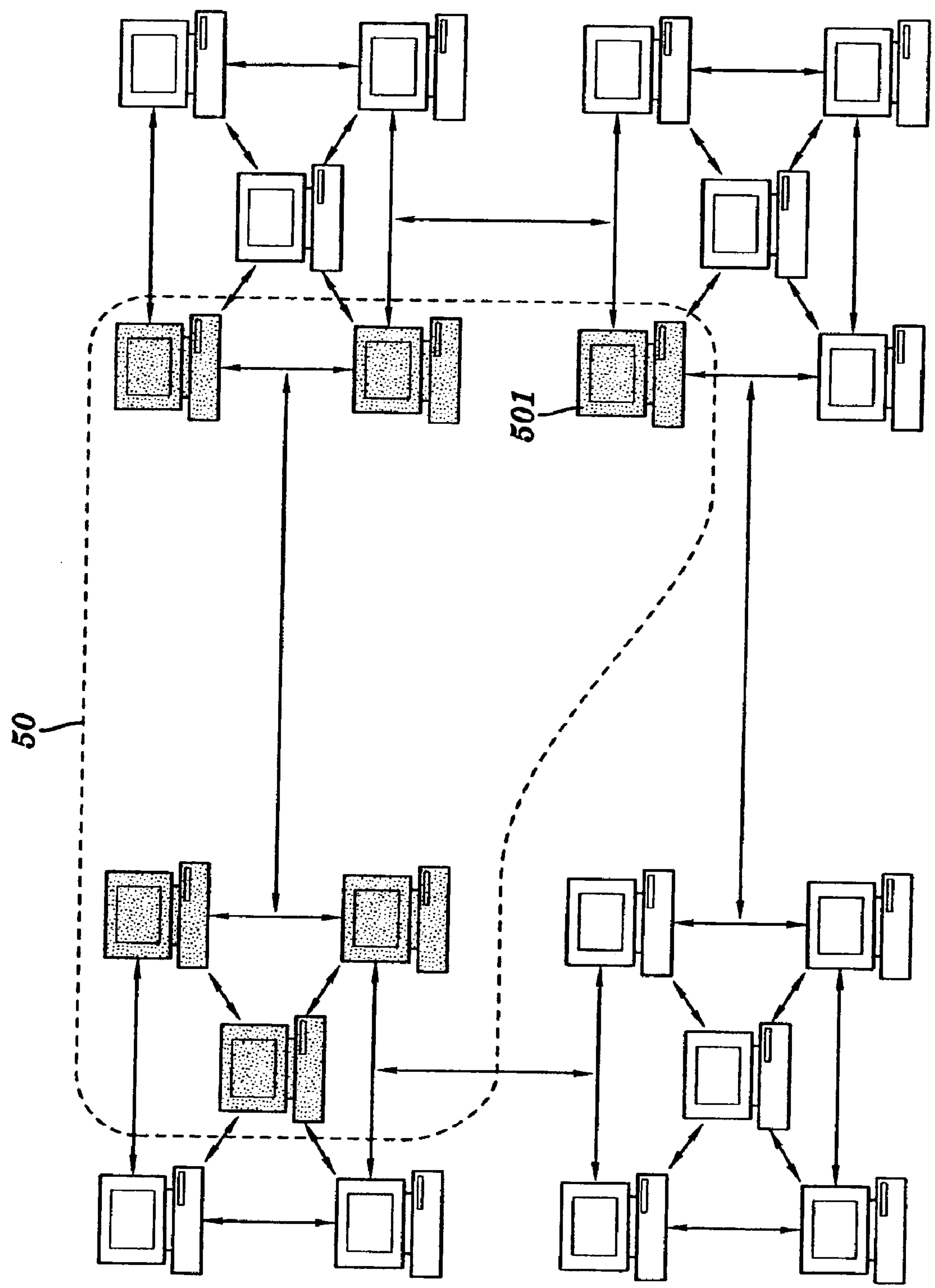
FIG. 5A illustrates a system having multiple processors, where one processor is to be removed from the system.
Figure 5B:
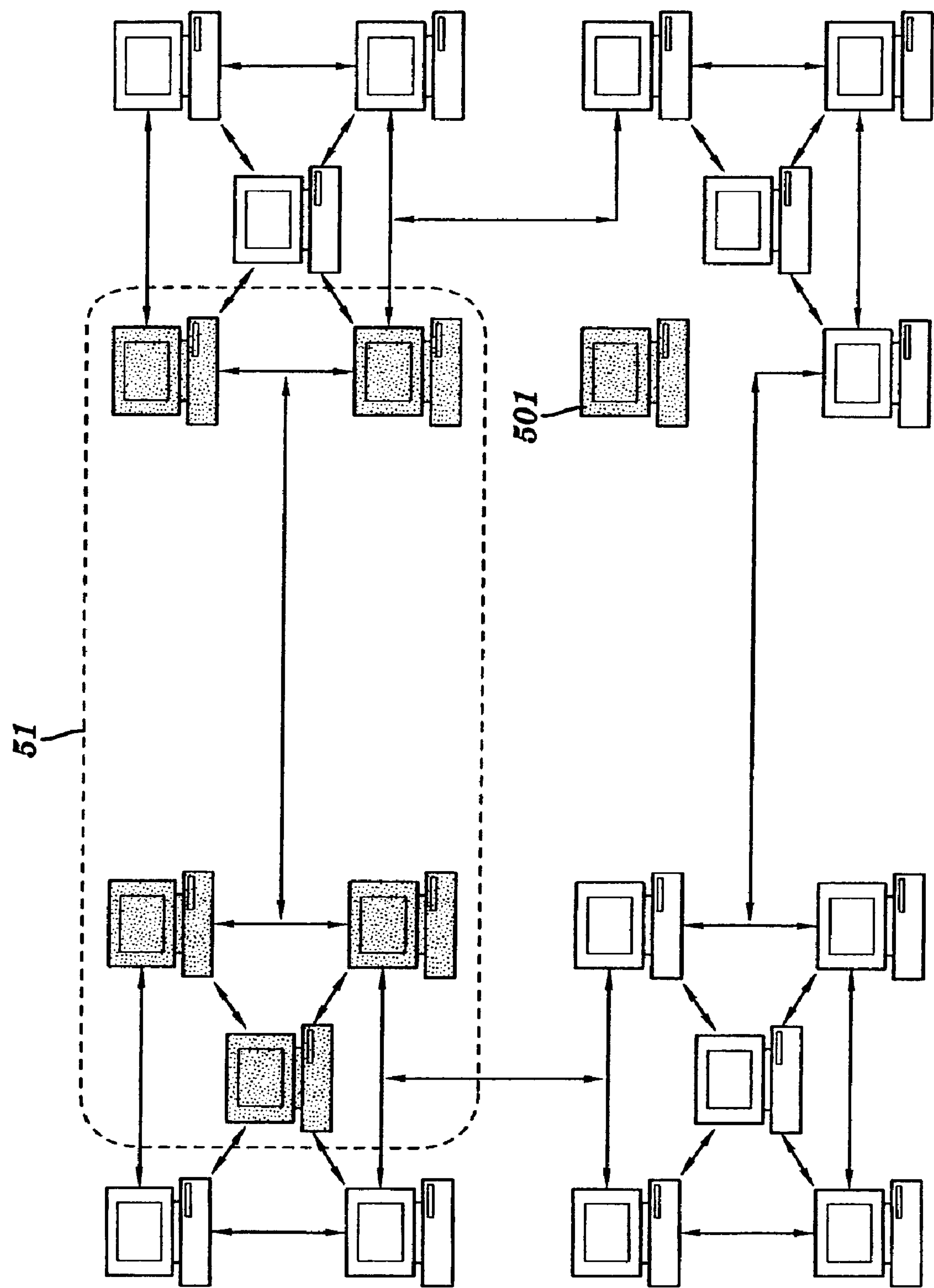
FIG. 5B shows the system of FIG. 5A, after a processor has been removed.

This case is an extension of Case 2 where the number of processors is dynamically changing. Processors may enter or leave the system, either because of faults or because they are operating in an on-demand environment. In addition, a change in the number of processors can lead to a change in the number or arrangement of clusters, so that the clusters also are dynamically changing. Furthermore, if the processors are of more than one type (and thus in more than one distinct group), the number of groups may be dynamically changing. For example, FIG. 5A shows a situation where processor 501 in cluster 50 is to be removed from the system. The cluster is reconfigured as cluster 51, as shown in FIG. 5B. It is possible that the removal of processor 501 will result in a reassignment of the service point of cluster 51.

The total distance between the processors in a cluster and the service point must be minimized dynamically to avoid loss in performance of the system. It is possible to recompute the clusters by using algorithm(N,p), each time one or more processors are added to the system or taken out of the system. This approach is very costly in terms of computing overhead and may cause significant performance degradation. Therefore, it is necessary to dynamically update the system for each of two cases: (i) adding a processor to the system, and (ii) removing a processor from the system. Procedures for these two cases are described below. It is assumed that an optimal set of clusters has been previously found using the algorithm(N,p).

Figure 5C:
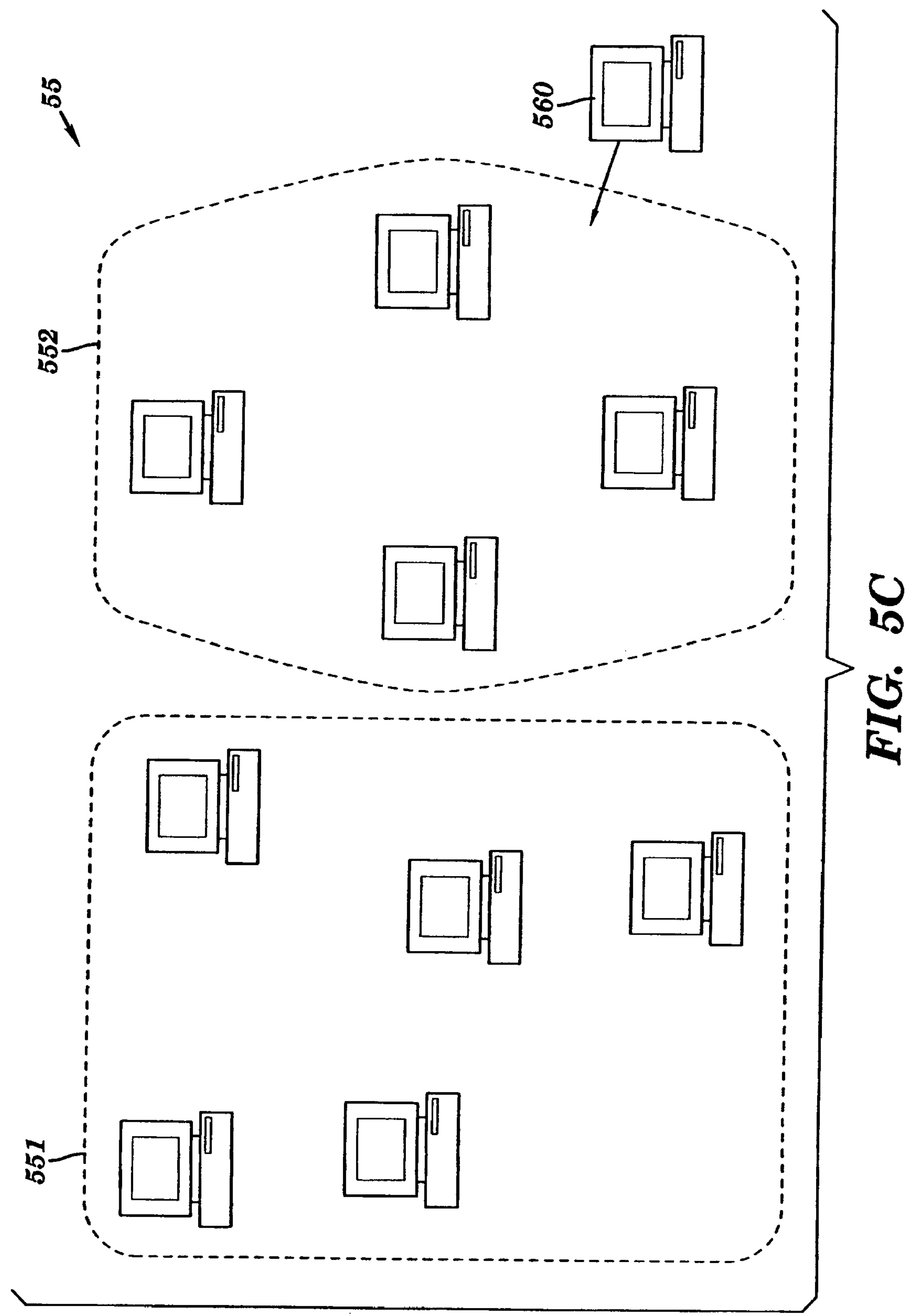
FIG. 5C illustrates a system having multiple processors, where one processor is to be added to the system.

(i) A new processor is added to the system: In this case, we test the added processor against all the service points of all the existing clusters. Then the new processor is added to the cluster that minimizes the total distance. Then algorithm (N,1) is used at that cluster to which the new processor is added to find a new service point. Note that this procedure does not necessarily optimize the system but is very fast. This procedure is illustrated schematically in FIG. 5C. In FIG. 5C, system 55 includes two clusters 551 and 552; it is desired to add new processor 560. Processor 560 will be added to cluster 552, because the total distance of the system is thereby kept at a minimum.

Figure 5D:
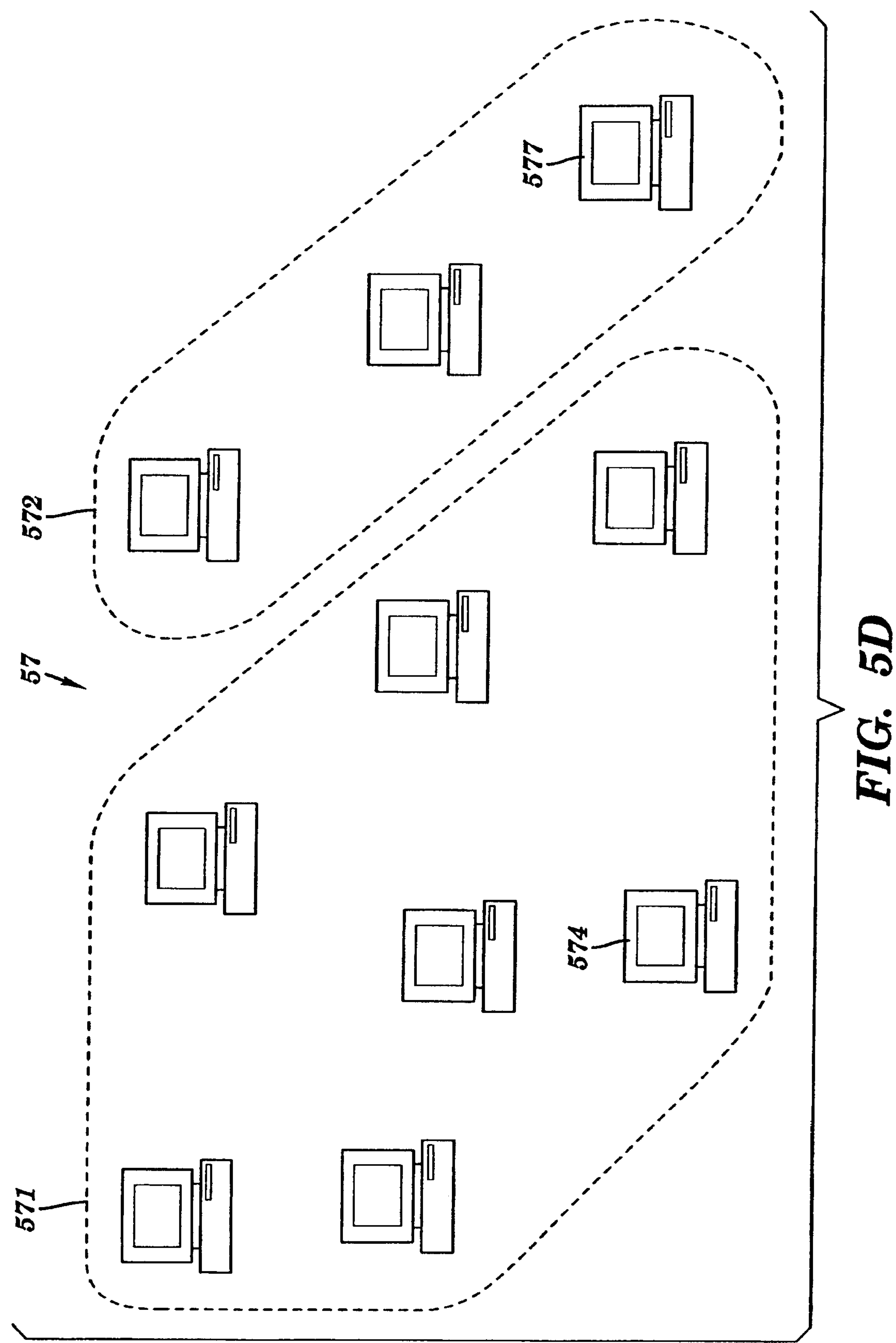
FIG. 5D illustrates a system having two clusters, where one processor is to be removed from the system.
Figure 5E:
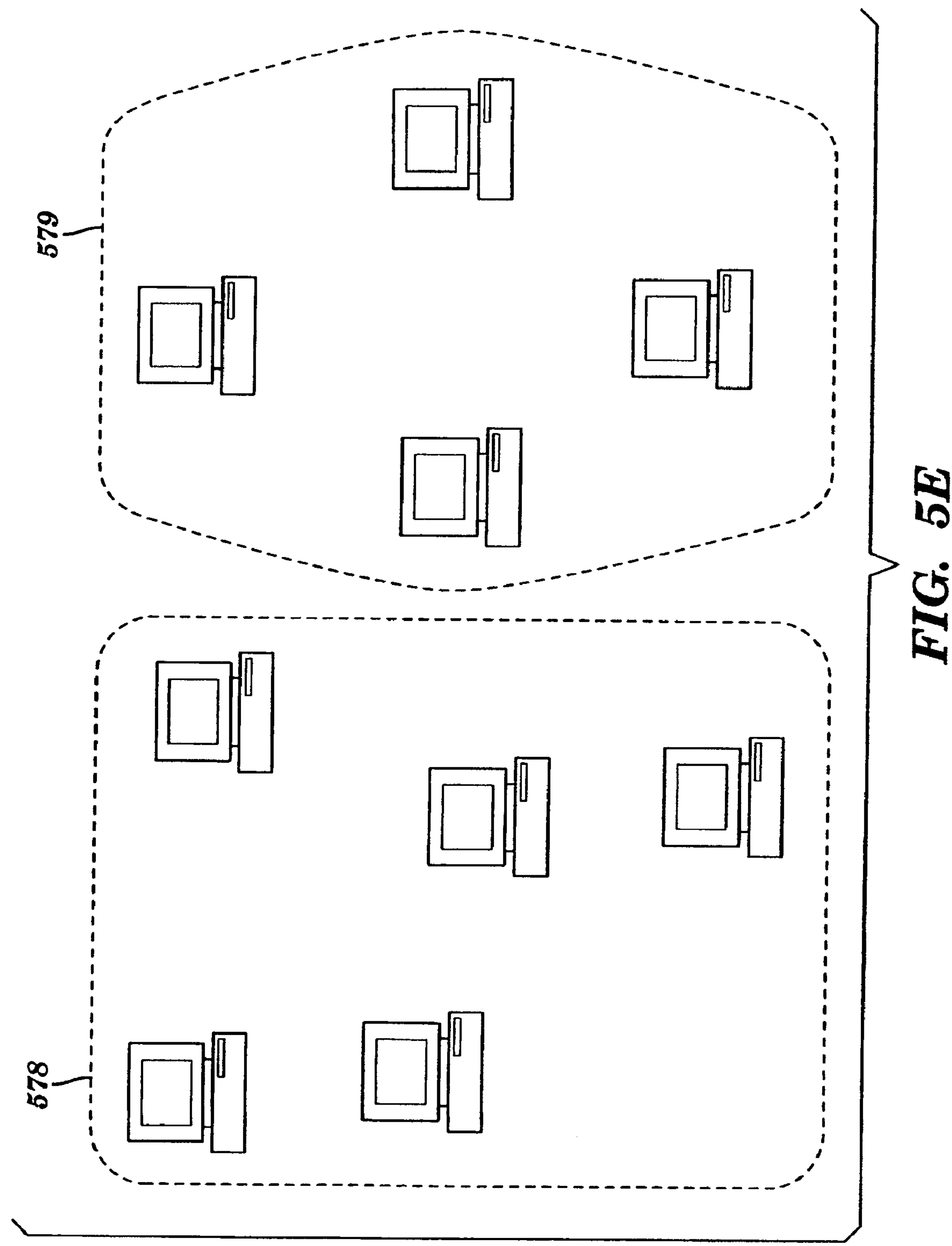
FIG. 5E illustrates the system of FIG. 5D after a processor has been removed, where the clusters have been reconfigured.

(ii) An existing processor is removed from the system: In this case, it is first determined from which cluster the processor is removed. There are two cases for this situation.

a) If the removed processor is not the one furthest from the service point, then it does not affect the maximum distance for that cluster. In that case, the processor is removed and the new service point is recomputed by using algorithm(N,1) for this cluster. This situation is illustrated in FIG. 5D, where system 57 includes clusters 571 and 572, and processor 574 is to be removed. No changes to the cluster configuration occur as a result.

b) If the removed processor is the one furthest from the service point then its removal does affect the maximum distance from the service point of the cluster. In that case, the processor is first removed from the cluster. In general, the system must then be rebalanced to maintain optimum performance. When a processor is removed from the current cluster, it may be possible to make the system more efficient by putting in another processor from another cluster to the current cluster. This situation is illustrated in FIG. 5E, where processor 577 has been removed from the system (compare FIG. 5D). As a result, new clusters 578 and 579 are formed to minimize the total distance of the system. To accomplish this, we first note that at each step of the algorithm (N,p) to create the final set of clusters, a previously created cluster is divided using the algorithm(N,2). Therefore the whole process of creating clusters can be expressed in a binary tree. All the final clusters are the leaf nodes of this binary tree.

When a processor is removed from a cluster, we consider the other sibling node of the cluster from which the processor is removed. The processors in the sibling node are examined as to whether moving a processor from the sibling node to the current cluster will minimize the overall distance of the system. If the overall distance of the whole system is not affected, no action need be taken. However, if the overall distance is decreased by moving the processor, a processor from the sibling node is removed and placed in the current cluster, so that the overall distance is again minimized. If the sibling node is a leaf node or an existing cluster, no further action need be taken. Otherwise, algorithm(n,2) is used to balance its children after removal of the processor.

The adjustments described above are local in nature and can be performed very fast; they do not, however, globally balance the whole system. Therefore, after a number of dynamic adjustments, the system may be considerably off balance; it may be necessary to reoptimize the system using algorithm(N,p) from time to time.

Case 4: Backup For Service Points.

Figure 6:
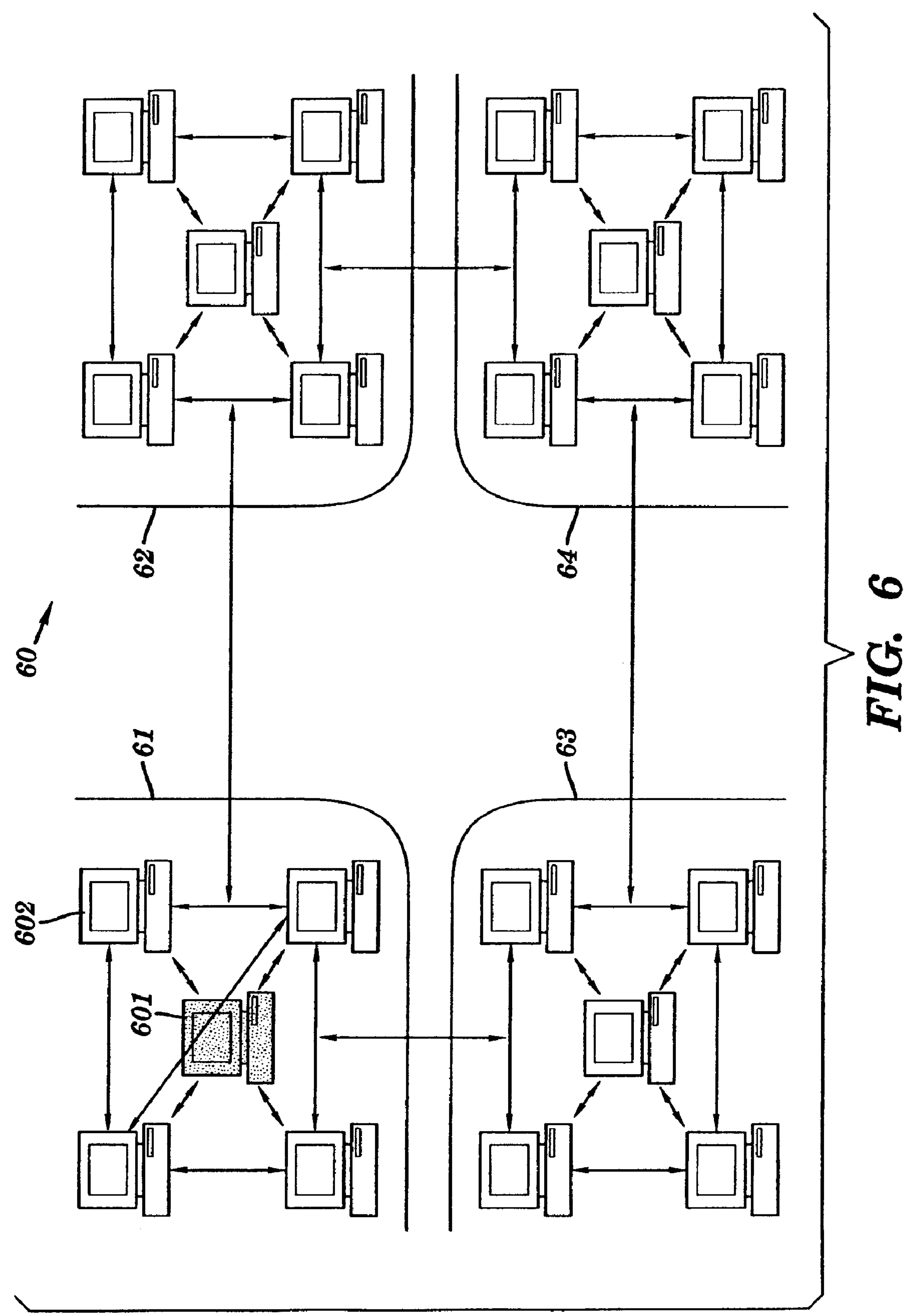
FIG. 6 illustrates a system having multiple processors configured into clusters each having a service point, where the service point of a cluster is to be removed from the system.

To ensure fail-safe operation of the system, the present invention also includes a method for providing dual service points for each cluster, where a backup service point keeps a mirror image of the information stored within the active service point and begins to function as the active service point in case of the failure of the service point during an update. It will be appreciated that the service points are no different from the regular processors of the system. Therefore, it is possible that a service point may have a fault and be removed from the system. In order to prevent system failure in this case, service information of the service point is stored in another processor in the same cluster. For example, system 60 shown in FIG. 6 includes four clusters 61, 62, 63 and 64, where the service point of cluster 61 is processor 601, and processor 602 is the backup processor. In case of a failure in the active service point 601, the backup service point 602 assumes the functions of the service point. Algorithm(N,1) may then be used to rebalance the cluster if necessary.

Case 5: Dynamic Number of Service Points.

A more general problem is the situation where the maximum allowable limit on the number of service points p is also changed. This can happen when a significant number of processors are either added to the system or taken out of the system at one time. This may also happen if the fractional value f (giving the maximum allowable number of service points p according to p=N*f) is also changed. There are two cases to consider:

(i) The new number of maximum allowable service points, p1, is greater than p. In this case, the algorithm(N,p) is used with the current number of clusters, but the algorithm is performed with the new number of clusters p1. This is similar to the solution described in Case 1, where in the first step each of the p clusters is divided once while others are left intact. The total sum of distances to the closest service point is computed in each case, and the cluster configuration is chosen that minimizes the total sum. This process is performed iteratively for p+1, . . . , p1.

(ii) The new number of maximum allowable service points, p2 is less than p. In this event it is necessary to recall the order in which each of the p clusters were generated (see the above discussion of Case 1). The clusters are recombined in the reverse order until only p2 clusters remain.

While the present invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

I claim:

1. A method for configuring a system having a plurality of processors to provide the system with at least one cluster of processors, each cluster having one service point, the method comprising the steps of:

computing a distance from each processor to other processors in the system;

computing a plurality of total distances, where each total distance is associated with one processor;

determining a minimum total distance from the plurality of total distances; and assigning the processor having the minimum total distance associated therewith as the service point.

2. A method according to claim 1, further comprising the step of partitioning the system into a plurality of clusters.

3. A method according to claim 2, wherein said partitioning further comprises:

sorting the processors in accordance with the total distance associated with each processor;

assigning each processor to one of two clusters;

determining a minimum total distance for the processors in each cluster in accordance with the plurality of total distances associated with the processors in said cluster; and assigning as the service point for each cluster the processor having the minimum total distance associated therewith in said cluster.

4. A method according to claim 1, wherein the processors are of different types, and the processors are assigned to clusters in accordance therewith.

5. A method according to claim 1, wherein said configuring is performed dynamically when a processor is added to the system.

6. A method according to claim 1, wherein said configuring is performed dynamically when a processor is removed from the system.

7. A method according to claim 6, wherein the partitioning of the system is dynamically changed when a processor is removed from the system.

8. A method according to claim 1, further comprising the step of assigning another processor as a backup service point.

9. A computer-readable storage medium having stored therein instructions for performing a method for configuring a system having a plurality of processors to provide the system with at least one cluster of processors, each cluster having one service point, the method comprising the steps of:

computing a distance from each processor to other processors in the system;

computing a plurality of total distances, where each total distance is associated with one processor;

determining a minimum total distance from the plurality of total distances; and assigning the processor having the minimum total distance associated therewith as the service point.

* * * * *